Feb. 10, 1931.  G. EGLOFF ET AL  1,791,618
PROCESS FOR CONVERTING HYDROCARBON OIL
Original Filed Feb. 18, 1922
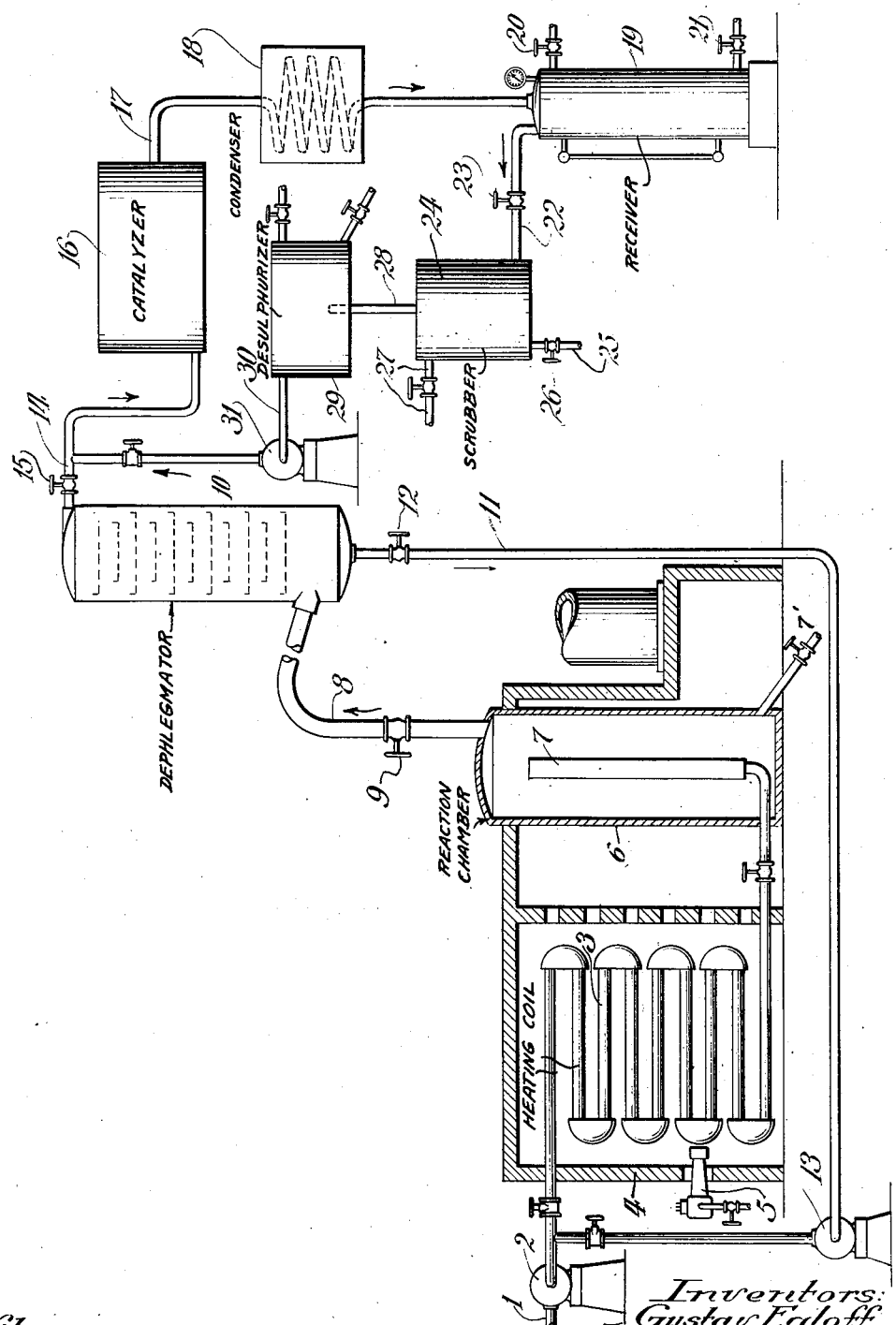
Witness:
Inventors:
Gustav Egloff
Jacque C. Morrell
By Frank L. Belknap. Atty.

Patented Feb. 10, 1931

1,791,618

UNITED STATES PATENT OFFICE

GUSTAV EGLOFF AND JACQUE C. MORRELL, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

PROCESS FOR CONVERTING HYDROCARBON OIL

Application filed February 18, 1922, Serial No. 537,482. Renewed October 16, 1928.

This invention relates to improvements in a process for converting hydrocarbon oil and refers more particularly to a process in which an increased yield and better quality distillate is produced from oil converted under pressure.

The single figure is a diagrammatic side elevational view partly in section of the apparatus.

Referring to the drawings, the oil to be treated is introduced from any convenient source through the line 1 and is charged by means of the pump 2 through the heating coils 3 mounted in a furnace 4 which is preferably heated by means of gas burners 5. The oil while being circulated through the heating tubes is subjected to pressure and is introduced after being raised to a conversion temperature, into the evaporating chamber 6 through the stand-pipe 7. The residual unvaporized oil is removed through pipe 7' while the vapors evolved in the evaporating chamber, pass off through the vapor line 8 controlled by a valve 9, to dephlegmating column 10 where a portion of the vapors are refluxed in the form of reflux condensate which is returned through the line 11 controlled by a valve 12 and recharged by means of the pump 13 into the inlet pipe through which the oil is charged to the heating coil. The dephlegmated vapors on the other hand pass over through the line 14 controlled by a valve 15 and are passed through a chamber 16 which contains a catalytic mixture such as pumice as a carrier and nickel or other catalytic metals. The vapors are treated in chamber 16 under the temperatures and pressures at which they normally issue from dephlegmators of oil cracking systems. Such temperatures may be from 400° F. to 450° F., more or less, and the pressure may be from atmospheric to 300 lbs. per square inch or higher. It will, of course, be understood that the temperature and pressure conditions within chamber 16 may be varied considerably without departing from the spirit and scope of the invention. The vapors after passing through this chamber are directed through a line 17 to water condenser 18 and are collected in receiver 19 as distillate. The receiver is equipped with a pressure relief valve 20 and a liquid draw-off valve 21. The uncondensed vapors and uncondensible gases which collect in the receiver rise through a line 22 controlled by a valve 23 and pass up through a scrubber 24 which contains sulphuric acid or other like purifying agents through which the gases percolate. The chamber 24 has a draw-off line 25 controlled by a valve 26 by means of which the impurities which are separated from the gases may be withdrawn from the chamber. The cleansing agent may be replenished from time to time through the inlet pipe 27.

The vapors and gases after passing through the scrubber 24, are directed though the line 28 to a second chamber 29 containing desulphurizing material such as iron oxide, litharge or caustic soda, or these minerals in combination. The gases are contacted with the desulphurizing materials in chamber 29 whereby the sulphur is removed from the gases and the acid character of the vapors and gases removed.

The vapors and gases passing from the chamber 29 are withdrawn therefrom through the line 30 and are charged by means of the pump 31 into the vapor line 14. Thus, the uncondensible oil constituents and pressure distillate gases are recycled and combined with the dephlegmated vapors to produce an improved pressure distillate which is finally collected in the receiver.

By treating the vapors in this manner, the unsaturated hydrocarbons are hydrogenated by passing them through the catalytic material and this action is promoted by the introduction of the purified uncondensible gas which is returned and recycled with the dephlegmated vapors. These returned gases and vapors consist principally of saturated hydrocarbons and when mixed with the vapors relieved from the top of the dephlegmator, they assist materially the catalytic agent in hydrogenating the unsaturated hydrocarbons. Thus, there will be produced a more completely saturated product in the receiver.

We claim as our invention:

A process for converting hydrocarbon oil, consisting in raising the oil to a cracking temperature in a heating zone, in permitting vaporization of the heated oil, in subjecting vapors evolved from the oil to dephlegmation, in subjecting the dephlegmated vapors to a catalytic treatment, in condensing the treated vapors and collecting the resulting distillate together with the uncondensed gases, in scrubbing the uncondensed gases, in then passing such gases through a desulphurizer and in finally admitting the desulphurized gases to a flowing stream of dephlegmated vapors prior to the subjection of the dephlegmated vapors to said catalytic treatment.

GUSTAV EGLOFF.
JACQUE C. MORRELL.